Figure 1:
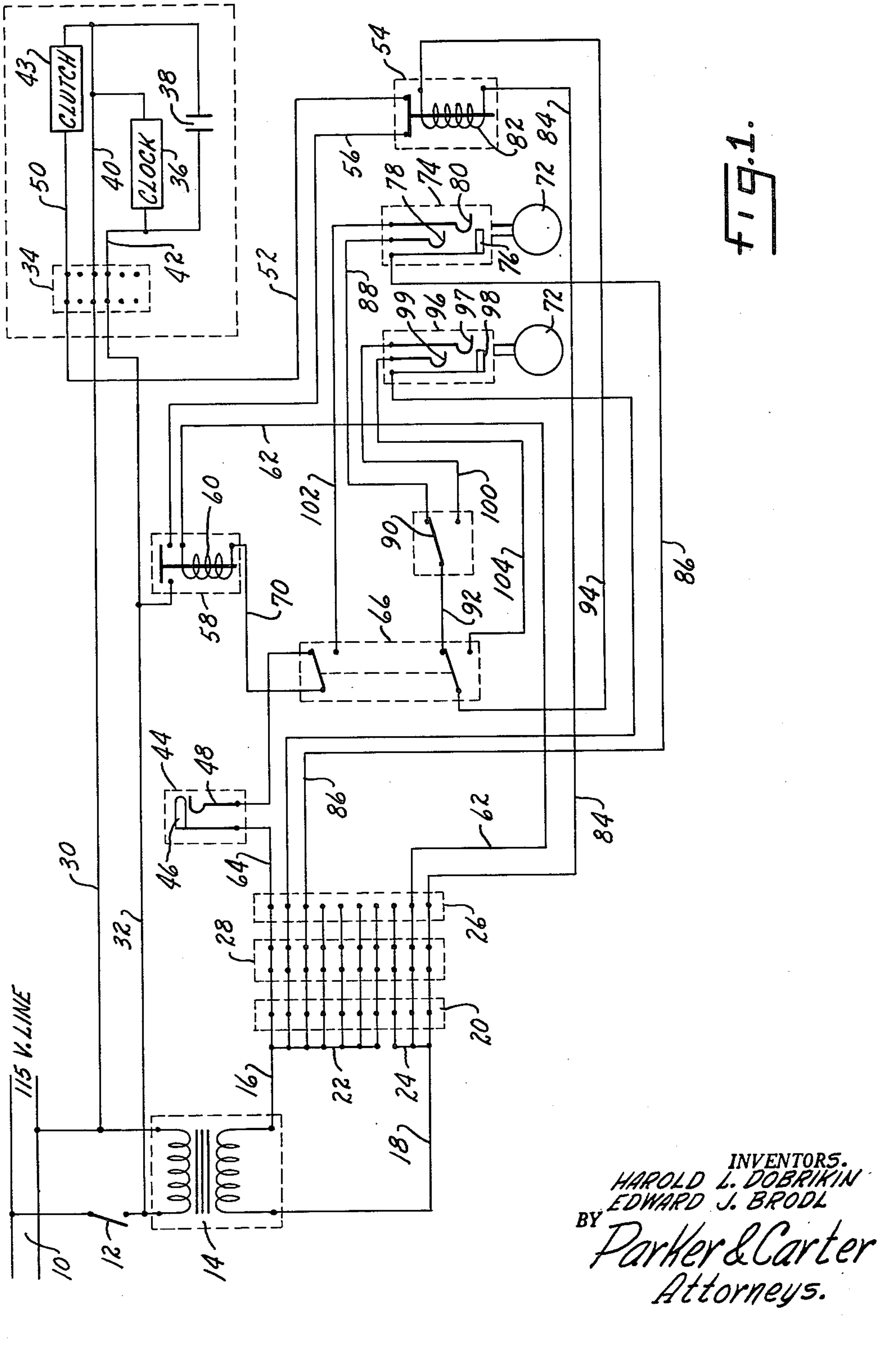

AIR SYSTEM TIMER

Filed May 7, 1959 2 Sheets-Sheet 1

INVENTORS.
HAROLD L. DOBRIKIN
EDWARD J. BRODL
BY Parker & Carter
Attorneys.

May 7, 1963 H. L. DOBRIKIN ET AL 3,088,311

AIR SYSTEM TIMER

Filed May 7, 1959 2 Sheets-Sheet 2

INVENTORS.
HAROLD L. DOBRIKIN
EDWARD J. BRODL
BY Parker & Carter
Attorneys.

United States Patent Office
3,088,311
Patented May 7, 1963

1

3,088,311
AIR SYSTEM TIMER

Harold L. Dobrikin, Highland Park, and Edward J. Brodl, La Grange Park, Ill., assignors to Berg Airlectro Products Co., Chicago, Ill., a corporation of Illinois
Filed May 7, 1959, Ser. No. 811,647
1 Claim. (Cl. 73—39)

This invention relates to timing devices and in particular to a timing device suitable for use in testing the air brake system of a tractor-trailer combination.

The air brake system in a tractor-trailer combination is very critical from a safety standpoint. The present practice in garages where tractor-trailer units are maintained is to have the mechanic working on the unit drive it around the block to test the brakes. If the brakes work satisfactorily during this test run the mechanic will give his O.K. and the unit is ready for service. This is a poor and inaccurate method of testing as it does not provide any means of checking each of the individual areas or points that receive air under pressure nor does it provide any means of measuring the period of time from initial application of the brakes until operating pressure is applied to the points of use.

One purpose of the present invention is to provide a means for measuring the period of time from initial application of the brakes in a tractor-trailer air brake system until operating pressure is received at the points of application.

Another purpose is to provide a means of measuring the time that elapses from release of the brake pedal in a tractor-trailer unit until air pressure has been removed from the points of use.

Another purpose is to provide a means for measuring the time from brake application until initial pressure is built up in an air pressure system.

Another purpose is to measure the time it makes for the pressure in an air brake system to build up from initial pressure to operating or effective pressure.

Another purpose of the invention is to provide a timing device, suitable for use in a garage, for testing the air brake system of a tractor-trailer combination.

Another purpose is to provide a means for measuring the time from application of the brake pedal on a tractor until provision of air to the glad hand connection between the tractor and trailer.

Another purpose is a compact and simple timing circuit for use in testing the air brake system on a tractor-trailer unit.

Another purpose is a compact electrical circuit for use in testing both application and release time of an air brake system used on a tractor-trailer combination.

Other purposes will appear in the ensuing specification, drawings and claim.

Figure 2:
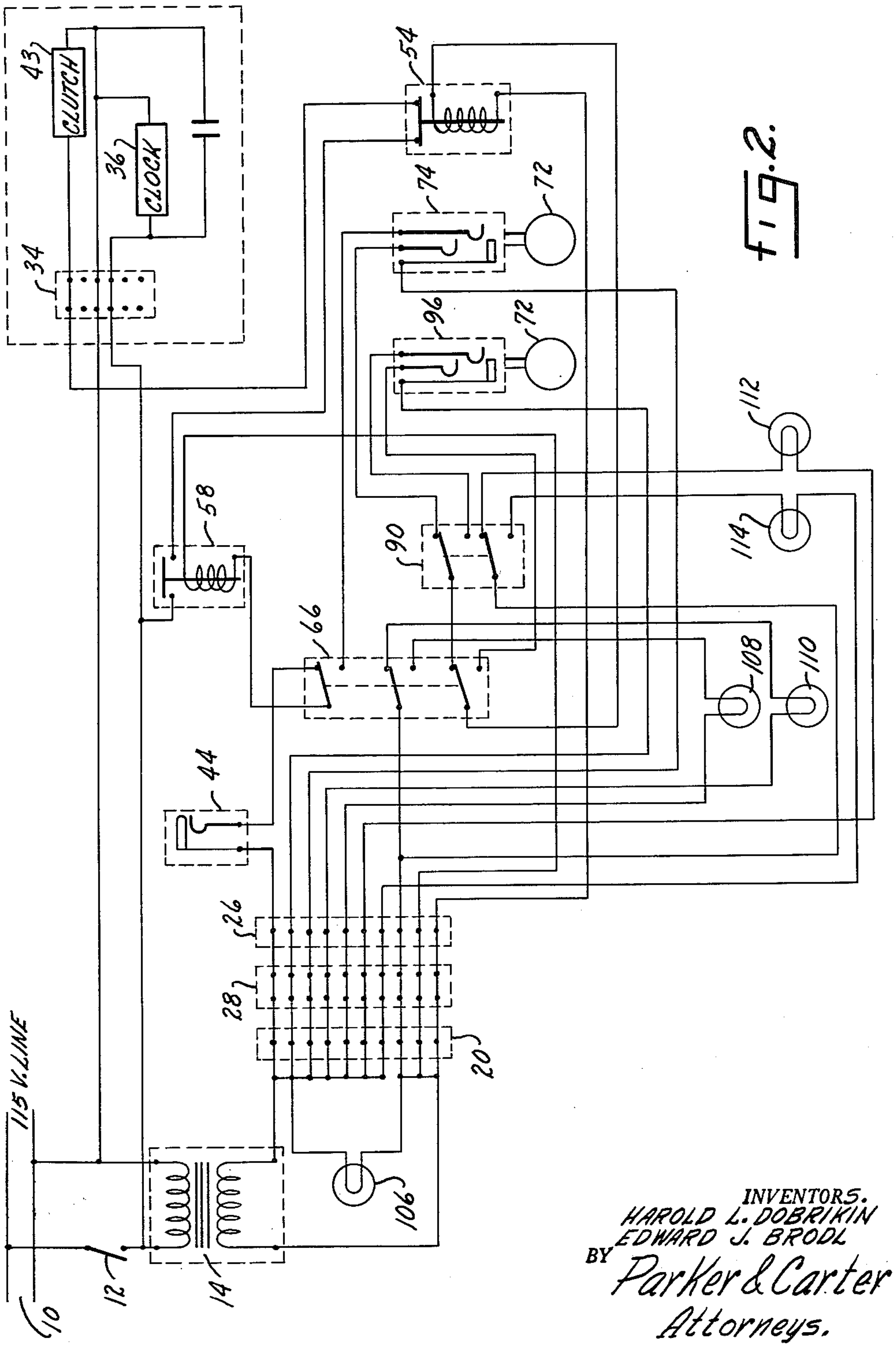

The invention is illustrated more or less diagrammatically in the following drawings wherein:

FIGURE 1 is a wiring diagram of the electrical circuit used in the timing device disclosed herein, and FIGURE 2 is a wiring diagram of a modified form of electrical circuit for use in the timing device disclosed herein.

In FIGURE 1, a suitable source of electrical energy 10, which may be the conventional 115 volt line, is connected through a switch 12 to the primary of a transformer 14. This transformer will step the line voltage down from 115 volts to 6 volts. The 6 volt secondary of the transformer 14 is connected through wires 16, 18 to a terminal strip 20. The terminal strip 20 has ten connecting points of which the top seven have been made common to wire 16 by the use of a connector wire 22. The bottom three connecting points are made common

2 to wire 18 by the use of connector wire 24 interposed between terminal strip 20 and terminal strip 26 is a connector strip 28.

Wires 30, 32 are connected to the 115 volt line or to the primary side of the transformer 14 and to a terminal strip 34. A suitable clock 36 is in parallel with a condenser 38 and both are connected by wires 40, 42 to the terminal strip 34. The terminal strip then provides a connection between wires 40, 42, and wires 30, 32 such that the 115 volt source is connected to the clock when switch 12 is closed. Clock 36 which is a continuously running clock after switch 12 is closed, also has a "stop watch" feature which is electrically operated by means of clutch 43. In other words, as soon as switch 12 is closed the clock starts operation, however, the "stop watch" feature of the clock is not started until clutch 43 is operated.

In order to energize the clutch and start the timing feature of the clock the electrical circuit to the clutch must be closed. This circuit comprises wire 30, wire 40, wire 50, wire 52, relay 54, which is normally closed in its unoperated condition, wire 56, relay 58 which in its unoperated position is normally open, and wire 32. It can thus be seen that in order to operate the clutch and so start the timing feature of this invention, relay 58 must be operated. In order to operate this relay coil 60 must be energized.

The circuit for coil 60 is shown to comprise wire 62 which connects to terminal strip 26, wire 24, and wire 18 which connects to one side of the secondary of transformer 14. The other side of the secondary of the transformer is connected through the terminal strips to wire 64 which is connected to contact 46 on jack 44. The other contact 48 on jack 44 is connected from switch 66 to coil 60. Jack 44 is suitably connected to a switch, not shown, which is placed beneath the brake pedal on the tractor of the tractor-trailer unit. When the brake pedal is depressed by the garage mechanic this switch is closed which in turn closes contact 48 to contact 46 and completes the circuit to coil 60. When release-application switch 66 is in the position shown the circuit is completed and coil 60 will close the circuit to clutch 43. This will start the timing operation of the clock. In other words, when the brake is depressed the air cylinders in the air pressure system are opened and air under pressure starts to flow into the system. At the same time, jack 44 closes the circuit to clutch 43 so that the timing device or the clock starts.

Once the timing device is started it will run until the pressure in the air system reaches a predetermined level. The mechanic may desire to measure the air pressure at the glad hand connection between the tractor and trailer, or he may desire to measure it at any other point in the air system. At the particular point he wishes to measure the pressure, he places a pressure pickup 72. This may be either a low pressure pickup or a high pressure pickup depending upon whether the mechanic wishes to measure the period from the initial application of the brakes until there is pressure in the range of 5 p.s.i. in the system or whether he wishes to measure the period from application until operating pressure, or pressure in the range of 60 to 70 p.s.i., is in the system.

Assuming the mechanic wishes to measure the period from initial application of the brakes until there is operating pressure in the air system, he places the pressure pickup at the particular point he wishes to measure. This pressure pickup is suitably connected to jack 74 such that when operating pressure is reached contacts 76 and 78, which may be called a first set of contacts, will close. Contact 80 on jack 74 is normally closed to contact 76 and its use will be described hereinafter in relation with timing the release. When contacts 76 and 78 close a circuit is completed through coil 82 of relay 54. The circuit comprises wire 84 which is connected to the terminal strip 26, wire 18 which is connected to one side of the secondary transformer 14, wire 16, wire 22, and wire 86 which is connected to contact 76. The circuit is then completed by wire 88 which is connected to high-low switch 90, wire 92 which is connected to release aplication switch 66, and wire 94 which is connected back to the coil 82. It can be seen then that when operating pressure is reached in the system the circuit for coil 82 is completed and relay 54 operates. When this relay operates the circuit to clutch 43 is then opened and the timing device stops. Any period of time indicated on the timing device then will be the period it takes from application of the brakes until operating pressure is reached in the air brake system.

If it is desired to measure the length of time from application of the brakes until initial pressure or 5 pounds pressure is reached in the air system, a pressure pickup is connected to jack 96. In this case, when the pressure goes above 5 p.s.i. contacts 97, 98, which may be called a second set of contacts are closed and the circuit to coil 82 is again completed. Contacts 97 and 98 are normally closed when the pressure is above 5 p.s.i. In this case high-low switch 90 is thrown opposite to the position shown. The circuit is identical to that before with the exception of high-low switch 90 and wire 100 which connects this switch to contact 97.

As was stated earlier it is also possible with this timing device to measure the release time or the time that it takes from release of the brake pedal until there is no longer pressure in the air system. When it is desired to measure the release time, the release-application switch 66 is thrown opposite to the position shown. Before this is done the brake pedal should be depressed so that there will be operating pressure in the air system. After this switch is thrown the normally open relay 58 is closed as coil 60 is supplied with electrical current through wire 70, wire 102, contacts 80 and 76, which may be called a third set of contacts and which are normally closed when there is operating pressure in the system, wire 86, the terminal strips and wire 16. The other side of the secondary is connected to wire 18, the terminal strips, and wire 62. When the brakes are released the pressure in the system will start to decrease and when the pressure has decreased to approximately 5 p.s.i., contacts 99 and 98 on jack 96, which may be called a fourth set of contacts, will close. These contacts are normally open when the pressure is above 5 p.s.i. and close when the pressure goes below that point. This will complete a circuit through wire 104, application-release switch 66, and wire 94 to the coil 82 of relay 54. This coil will operate relay 54 and open the circuit to clutch 43. This will cause the clock to stop. Therefore, it can be seen that the length of time from release of the brakes until the pressure is 5 p.s.i. or less can also be measured with the timing system shown herein. It is very necessary that this release time be measured by the garage mechanic as it is an important factor in determining whether or not the air brake system is satisfactory.

The circuit shown in FIGURE 2 is the same as the circuit shown in FIGURE 1 with the addition of certain circuits to provide power for the indicating lamps shown herein. These indicating lamps are activated when the switches are thrown to the various positions discussed above. When switch 12 is initially closed and completes the circuit to the clock and transformer 14, lamp 106 will be lit to indicate that the system is on and is ready for operation. Lamps 108 and 110 are connected to application-release switch 66 such that when the switch is in the position shown in FIGURE 1, lamp 110 will be lit to show that the application of the air brake system is being tested whereas when the switch is opposite to that shown in FIGURE 1, lamp 108 is then lit to show that the release time of the air brake system is being tested. Each of these lamps is connected to the terminal strip and from there to the secondary of the transformer 14. Lamps 112 and 114 are connected to the high-low switch 90. When the switch 90 is in the position shown in FIGURE 1 lamp 112 will be lit indicating high pressure response is being measured whereas lamp 114 will be lit when the switch is opposite that shown in FIGURE 1 indicating that the low pressure response is being measured.

The entire timing device including the clutch, clock and associated electrical circuit may be suitably mounted in a control box so that the garage mechanic can set each of the switches to make the desired measurements.

The use, operation and function of the invention are as follows:

In order to adequately test an air brake system on a tractor-trailer unit it is necessary that the garage mechanic know the time it takes from application of the brake pedal until initial pressure, approximately 5 p.s.i., is reached in the system as well as the time it takes to reach operating pressure, 60–70 p.s.i. It is also important that the release time or the time from release of the brake pedal until the pressure drops below 5 p.s.i. be known. The timing device shown herein has provision for making each of these measurements. The clock 36 is a continuously running clock and has a "stop watch" feature which is activated by clutch 43. When any of these specified periods of time are to be measured the clutch is operated at the beginning of the period and is released or disengaged at the end of the timing period. The clutch is controlled by two relays 54, 58. Relay 58 is normally open and relay 54 is normally closed. When the timing period is started, relay 58 is closed to complete the circuit to the clutch. When relay 54 is opened the clutch is stopped which ends the timing period. The operation of these two relays is controlled by a switch placed under the brake pedal on the tractor and by pressure pickups that are placed at various points in the air pressure system.

When the application time is to be measured the brake pedal is depressed which closes the contacts on jack 44 and completes the circuit through the coil of relay 58. This completes the circuit to the clutch and starts the timing device. When the pressure has reached a predetermined level, either operating pressure or initial pressure, the pressure pickups suitably connected by hoses or the like to the jacks close either the contacts on jack 74 or the contacts on jack 96. This completes the circuit to the coil of relay 54. Current flowing through this coil will open this relay which in turn opens the clutch circuit and stops the timing device.

If the mechanic wants to measure the release time he throws the release-application switch to the release position after he has obtained operating pressure in the air system. This closes the circuit to the clutch and starts operation of the timing device. When the pressure has decreased to approximately 5 pounds or less the contacts on jack 96 will close which will open the clutch circuit and stop the timing device.

There are only three switches that need be operated by the mechanic, namely, the power switch 12, the release-application switch and the high-low switch. We have also placed indicating lights in the circuit so that the mechanic knows if he has power and also so he may know the position of the application switch and the high-low switch.

There are many modifications and alterations possible to this device which are within the scope of the invention. For example, instead of having one release-application switch there could be two switches. Also, instead of having a continuously running clock with a "stop-watch" feature it may be necessary to have only the timing feature. Also the system has been described in connection with measuring initial pressure and operating pressure on a tractor-trailer unit, it should be realized that the invention shown and described herein is equally satisfactory for measuring time intervals in any type of air system. Also the timing circuit is not limited for use in an air pressure timing device as it is easily adapted for other use.

We claim:

An air pressure testing and timing device for measuring the time from initial application of air pressure to a system until a predetermined pressure has been attained at a given point in the system, and for measuring the time from release of operating pressure until the pressure drops below a predetermined pressure, including an electrical time indicator having an electrically operated clutch and a source of electrical energy, a pair of relays, one of said relays being normally open and the other being normally closed, an electrical circuit connecting the said relays, clutch and source, means for closing said normally open relay to operate said clutch and start said time indicator including a switch adapted to operate upon initial application of air under pressure to said air system, a first set of contacts responsive to variations in air pressure and adapted to open said normally closed relay and release said clutch to stop said time indicator when a predetermined level of air pressure has been reached, a second set of contacts responsive to variations in air pressure lower than that to which said first set of contacts is responsive, a switch for selecting either said low pressure set of contacts or said high pressure set of contacts, a third set of contacts effective to close said normally open relay to operate said clutch and start said time indicator, one of the contacts in said third set of contacts being one of the contacts in said first set of contacts, a switch for selecting either of said third set of contacts or the switch operable upon initial application of air pressure to said system, a fourth set of contacts effective to open said normally closed relay and release said clutch to stop said time indicator when the air pressure has been reduced to a predetermined level, one of the contacts in said fourth set of contacts being one of the contacts in said second set of contacts.

References Cited in the file of this patent

UNITED STATES PATENTS

| | | |
|---|---|---|
| 2,203,908 | Hess | June 11, 1904 |
| 2,294,031 | Hobbs | Aug. 25, 1942 |
| 2,366,548 | Oestreicher | Jan. 2, 1945 |
| 2,472,973 | Hoffman | June 14, 1949 |
| 2,544,685 | Jackson | Mar. 13, 1951 |
| 2,630,171 | Allgaier | Mar. 3, 1953 |
| 2,672,602 | Rees | Mar. 16, 1954 |
| 2,682,770 | Strickler | July 6, 1954 |
| 2,872,806 | Mamzic | Feb. 10, 1959 |
| 2,893,236 | Coon et al. | July 7, 1959 |
| 2,904,996 | Lamb | Sept. 22, 1959 |
| 2,906,928 | Klein | Sept. 29, 1959 |
| 2,908,848 | Hull | Oct. 13, 1959 |
| 2,923,861 | Colt | Feb. 2, 1960 |